United States Patent [19]

Hunter

[11] 4,068,617
[45] Jan. 17, 1978

[54] APPARATUS FOR COATING WIRE ON A SPOOL

[75] Inventor: Edward E. Hunter, Akron, Ohio

[73] Assignee: The Goodyear Tire & Rubber Company, Akron, Ohio

[21] Appl. No.: 682,709

[22] Filed: May 3, 1976

[51] Int. Cl.² ............................................. B05C 3/109
[52] U.S. Cl. ........................................ 118/50; 118/64
[58] Field of Search ............... 118/50, 50.1, 416, 428, 118/423; 427/294–298, 236, 238; 214/17 B

[56] References Cited

U.S. PATENT DOCUMENTS

| 2,124,162 | 7/1938 | Eddison et al. | 118/50 X |
| 2,858,795 | 11/1958 | Walker | 118/50 |
| 3,560,300 | 2/1971 | Eigenmann | 118/50 X |
| 3,801,360 | 4/1974 | Dahlgren | 118/50 X |
| 3,895,138 | 7/1975 | Sewell et al. | 118/50 X |

FOREIGN PATENT DOCUMENTS 838,515  12/1938  France .................................. 118/49

Primary Examiner—Morris Kaplan
Attorney, Agent, or Firm—F. W. Brunner; R. S. Washburn; Frederick K. Lacher

[57] ABSTRACT

An apparatus for coating wire tire cord on a spool with a substance for increasing the bond between the wire tire cord and rubber material used in the production of tires. The apparatus is composed of a hollow pipe which forms a chamber in which the spools of wire are coated. The pipe is inclined from the horizontal and is provided with a longitudinally extending trackway on which spools of wire can roll, by gravity, axially through the pipe and treatment chamber. Means are provided for circulating liquid coating through the chamber and for alternately creating a vacuum and pressure within the chamber to increase penetration of the liquid coating into the interstices between segments of cord wrapped on the spool. Other means are supplied for circulating a drying fluid in the chamber to dry the liquid coating on the wire of each spool disposed within the treatment chamber.

8 Claims, 2 Drawing Figures

APPARATUS FOR COATING WIRE ON A SPOOL

BACKGROUND OF THE INVENTION

The invention is particularly well suited for coating wire tire cord wound on a spool, although the techniques involved are also applicable to coating a textile cord wound on a spool. It has been found more convenient and cheaper, from a cost standpoint, to coat the wire when it is on the spool rather than removing the wire from the spool before coating it.

Coiled wire armatures for motors have been coated by dipping them in vertically disposed vats of liquid coating material. In such cases, the armatures are first placed under a vacuum to remove any moisture. The vacuum is gradually decreased as the vat is slowly filled with liquid coating, under pressure, the pressure being utilized to increase penetration of the liquid coating into the interstices of the armature. It is necessary to lift the armatures into and out of the vats, thereby necessitating the use of expensive cranes and other equipment for handling the armatures, especially those of very large motors. Spools of wire tire cord are also large and difficult to handle. The invention is directed to providing a highly simplified apparatus in which spools of wire can be more conveniently handled as they are coated with a liquid.

Briefly stated, the invention is an apparatus for coating a continuous element, such as a wire tire cord, while it is wound on a spool which is used in the storage and transportation of the element. The apparatus comprises a chamber which is sealable from the ambient atmosphere. A trackway is provided for guiding spools through the chamber. The trackway is inclined from the horizontal such that the spools can roll, by gravity, along the trackway through the chamber. Means are supplied for circulating liquid coating through the chamber, for alternately creating a vacuum and pressure within the chamber to increase penetration of the liquid coating into the interstices or voids between adjacent segments of the element on the spool, and for drying the liquid coating on the element while the spool is still in the chamber.

DESCRIPTION OF THE DRAWING

The following description of the invention will be better understood by having reference to the annexed drawing, wherein.

DETAILED DESCRIPTION OF THE INVENTION

Figure 2:
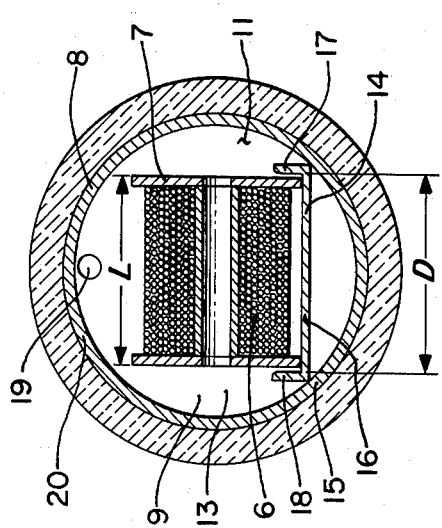
FIG. 2 is a section of the apparatus viewed from the plane 2—2 of FIG. 1.

With reference to the drawing, there is shown an apparatus 5 for coating continuous elements of wire tire cord 6, wound on a spools 7, with a substance for increasing the bond between the wire tire cord 6 and rubber material used in the production of tires. The wire coating apparatus 5 comprises a hollow, cylindrical housing or pipe 8 which is thermally insulated and has a pair of opposing, open ends 9 and 10. A pair of front and rear cover plates 11 and 12 are used to close the open ends 9 and 10 of the pipe 8 to seal the inside of the pipe, or chamber 13 from the ambient atmosphere. The pipe 8 is supported from the floor of a factory building by opposing pairs of legs of different lengths, such that the longitudinal axes of the pipe 8 and chamber 13 are inclined from the horizontal at an angle, e.g. 3°–5°, which is sufficient to cause the spools 7 to roll, by gravity, axially through the pipe 8.

Figure 1:
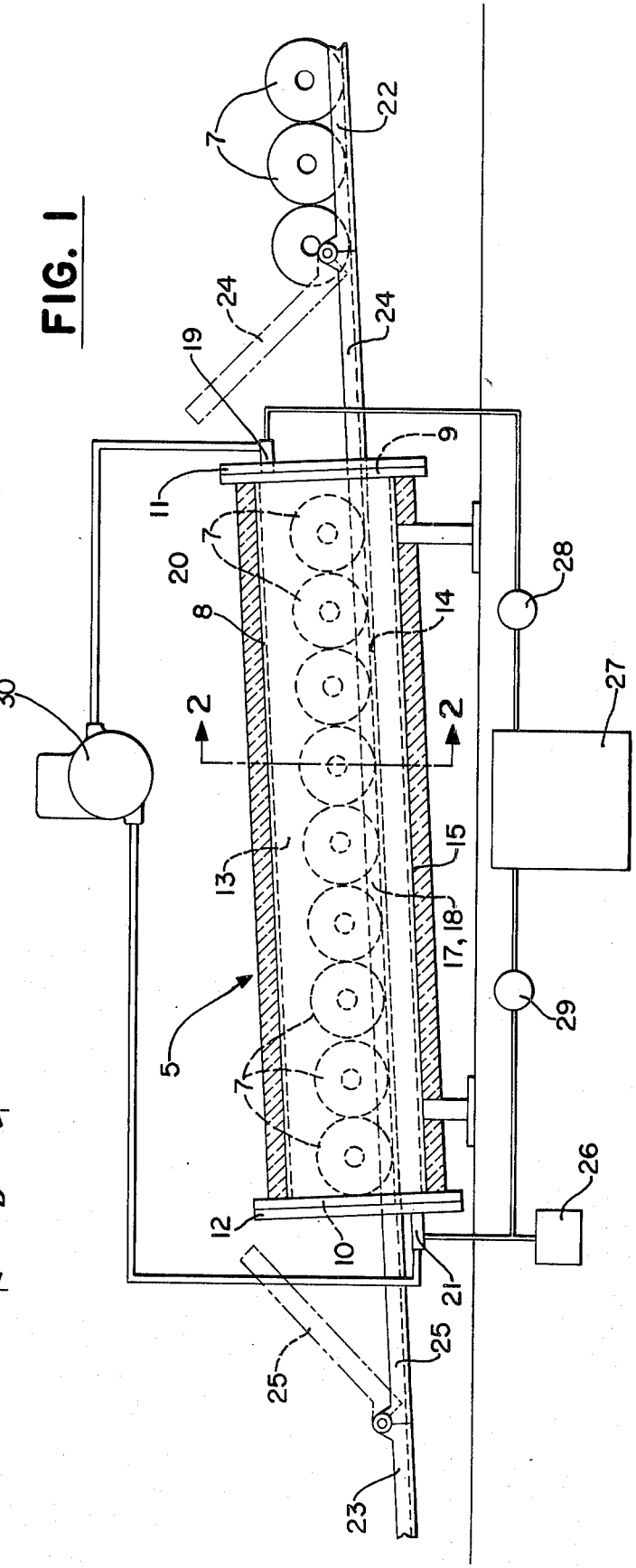
FIG. 1 is a side view of an apparatus made in accordance with the invention.

A trackway 14 is disposed along the bottom portion 15 of the pipe 8 for guiding the spools 7 of wire 6 through the pipe 8 and chamber 13. The trackway 14 is of any suitable design, e.g. a rigid metal channel having a solid web 16 with upstanding side flanges 17 and 18 disposed along the parallel marginal edges of the web 16. The distance D between the side flanges 17 and 18 is slightly larger than the overall length L of the spools 17 of wire 6, as best seen in FIG. 2. Also as shown in FIG. 2, the transverse cross section of the chamber 13 within the pipe 8 is larger than the longitudinal cross section of the spools 7. The chamber 13 may have a length great enough to accommodate more than one of the spools 7 and preferably nine spools as shown in FIG. 1. Because of the slope of the pipe 8 and corresponding inclination of the trackway 14, the spools 7 of wire 6 will roll, by gravity, along the trackway through the chamber 13.

A fluid inlet 19 is disposed in the front cover plate 11 adjacent the top portion 20 of the pipe 8, in contrast to a fluid inlet 21 which is disposed in the rear cover plate 12 adjacent the bottom portion 15 of the pipe 8. Liquid coating, pumped or allowed to flow, by gravity, into the chamber 13 through the fluid inlet 19, can be drained, by gravity, through the fluid outlet 21. A vacuum and pressure are alternately created within the chamber 13.

A pair of conveyors 22 and 23, similar in design to the channel trackway 14, is provided adjacent the front and rear cover plates 11 and 12 for transporting spools 7 of wire 6 to and from the chamber 13. The loading and discharge conveyors 22 and 23 are in angular alignment with the trackway 14. The loading conveyor 22, adjacent the front cover plate 11, has a movable section 24 which can be rotated out of interfering relation with the removal and placement of the front cover plate 11. The discharge conveyor 23, adjacent the rear cover plate 12, likewise has a movable section 25 which can be rotated out of interfering relation with the removal and placement of the rear cover plate 12.

In operation, a number of spools 7 of wire 6 are placed side-by-side on the loading conveyor 22 with the movable section 24 in raised position. The front cover plate 19 of the pipe 8 is then removed so that the movable section 24 of the loading conveyor 22 can be rotated down into position for conveying the spools 7 of wire 6 into the treatment chamber 13, i.e. the spools 7 of wire 6 will roll, by gravity, onto and along the trackway 14.

When the treatment chamber 13 is filled with the desired number of spools 7 of wire 6, the movable section 24 of the loading conveyor 22 is raised to allow securing the front cover plate 11 over the open end 9 of the pipe 8 to seal the treatment chamber 13 from the ambient atmosphere. A vacuum is created within the treatment chamber 13 by any suitable pumping machine 26 in communication with the fluid outlet 21 to remove any moisture which has collected on the spools 7 of wire 6. Liquid coating is circulated, under pressure, through the fluid inlet 19 into the treatment chamber 13 from a source 27 of supply by an appropriate pumping device 28. Simultaneously, the vacuum within the treatment chamber 13 is gradually decreased and the fluid outlet 21 closed to maintain the liquid coating in the treatment chamber 13. A desired fluid pressure is continuously maintained within the treatment chamber 13 or, alternately, a vacuum is created in the treatment chamber 13 to increase the penetration of the liquid coating into the voids or interstices between the segments of wire 6 coiled on the spools 7. The treatment chamber 13 is drained after the wire 6 on the spools 7 has been thoroughly impregnated with liquid coating by any suitable pumping machine 29 for returning unused liquid coating to the source 27 of supply. A heated fluid, e.g. hot air, is then circulated through the fluid inlet 19 by any appropriate pumping and heating device 30 into the treatment chamber 13 for drying the liquid coating on the wire 6 of the spools 7. After the drying operation is completed, the rear cover plate 12 is removed and the movable section 25 of the discharge conveyor 23 rotated from its raised position (in dotted line) down into place for receiving the spools 7 of wire 6 as they roll, by gravity, from the trackway 14 onto the discharge conveyor 23 for removal from the treatment chamber 13 and transport to other facilities. In the meantime, the loading conveyor 22 is reloaded with a fresh supply of spools 7 of wire 6.

Thus, there has been provided a highly improved device for coating wire tire cord when it is wrapped on a spool on which the tire cord is stored and transported. Forces of gravity are utilized to cause movement of the spools of wire into and out of a chamber in which the spools of wire are first treated with a liquid coating and then afterward subjected to a heated fluid for drying the liquid coating on the wire. An apparatus and method for similarly treating a number of spools of wire positioned within a treatment chamber, in tandem, or axial end-to-end relation, is described in copending application Ser. No. 682,710, filed the same date as this application.

What is claimed is:

1. An apparatus for coating a continuous element, such as a wire tire cord, wound on a spool comprising:
   a. an elongated chamber having openings at opposite ends, closures at said ends for said openings to permit the passage of said spool and for sealing from the ambient atmosphere, said chamber having a transverse cross section larger than the longitudinal cross section of said spool;
   b. a trackway extending longitudinally of said chamber for guiding said spool through the chamber, the trackway having a width at least as great as the length of said spool and being inclined from the horizontal such that said spool will roll, by gravity, along the trackway;
   c. means for circulating liquid coating, under pressure, to the chamber;
   d. means for creating at least a partial vacuum in the chamber;
   e. means coacting with the vacuum creating means (d) for alternately creating fluid pressure in the chamber;
   f. outlet means for removing residual liquid coating from said chamber; and
   g. means for circulating a heated fluid through the chamber to dry liquid coating on the element.

2. The apparatus of claim 1 wherein the liquid circulating means (c) includes:
   h. an inlet through which liquid coating enters the chamber, the inlet being adjacent one of two opposing ends of the trackway; and
   i. said outlet through which liquid coating exits the chamber being adjacent the other of the two opposing ends of the trackway.

3. The apparatus of claim 2, wherein the chamber comprises:
   h. a hollow pipe which has opposing open ends and is inclined from the horizontal such that the longitudinal axis of the pipe parallels the longitudinal axis of the trackway; and
   i. means for sealing the open ends of the pipe.

4. The apparatus of claim 3, wherein the outlet is disposed in the end of the pipe which is vertically lowest, such that the liquid coating will flow, by gravity, from the inlet, through the chamber, and then out the outlet.

5. The apparatus of claim 4, wherein the trackway includes a rigid, U-shaped channel having a web for supporting said spool and upstanding side flanges for maintaining said spool on the web.

6. The apparatus of claim 5, which includes a pair of spool supporting conveyors extending from opposing ends of the pipe for transporting said spool to and from the trackway, the conveyors being in angular alignment with the trackway.

7. The apparatus of claim 6, wherein the loading conveyor on which said spool rolls onto the trackway, includes means for keeping said spool on the loading conveyor from rolling, by gravity, onto the trackway and into the chamber.

8. The apparatus of claim 1 which includes:
   j. said chamber having a length greater than at least twice the diameter of said first-mentioned spool to accommodate at least one additional spool of the same size as said first-mentioned spool.

* * * * *